Feb. 4, 1969  H. A. WHITE, JR  3,425,677
THERMAL BARRIER
Filed Sept. 23, 1965
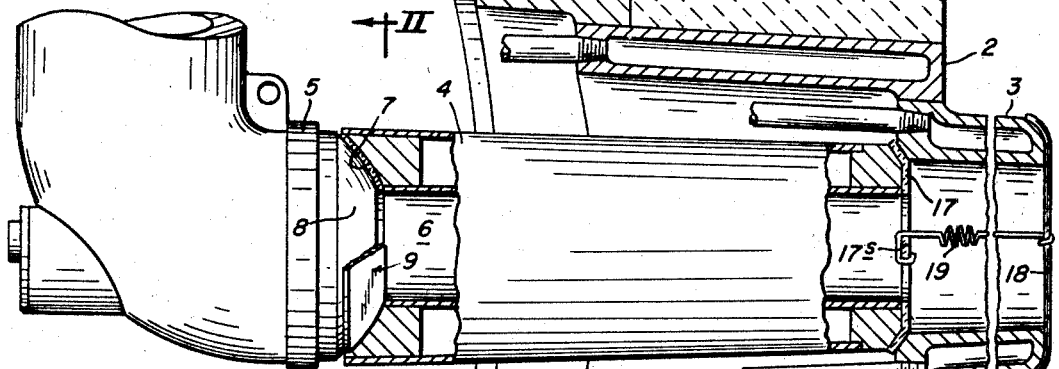
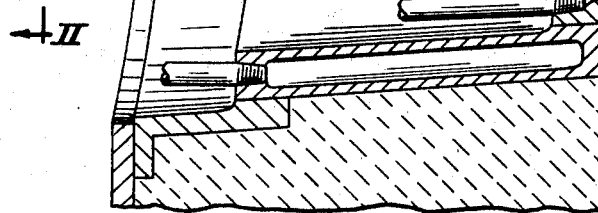
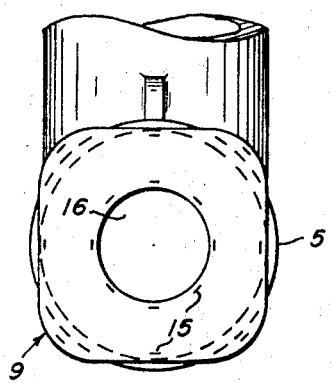
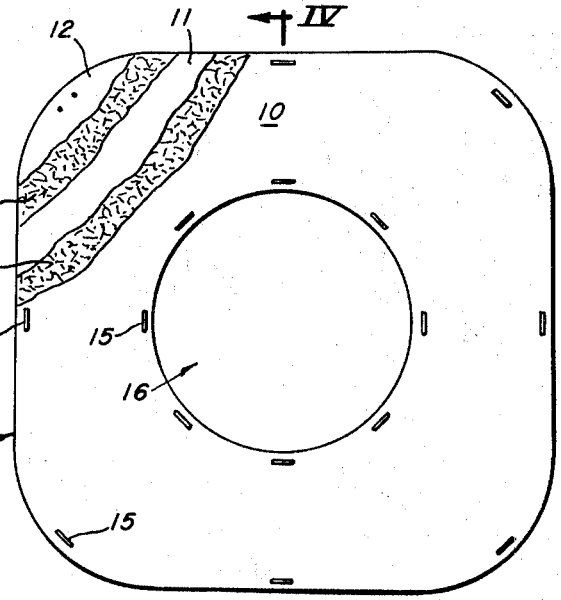
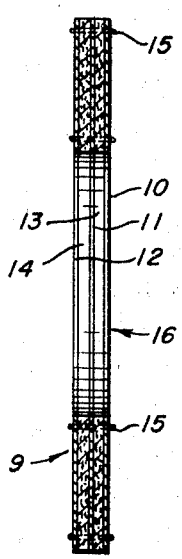
INVENTOR
HERBERT A. WHITE, Jr.
By Stanley J. Price, Jr.
Attorney

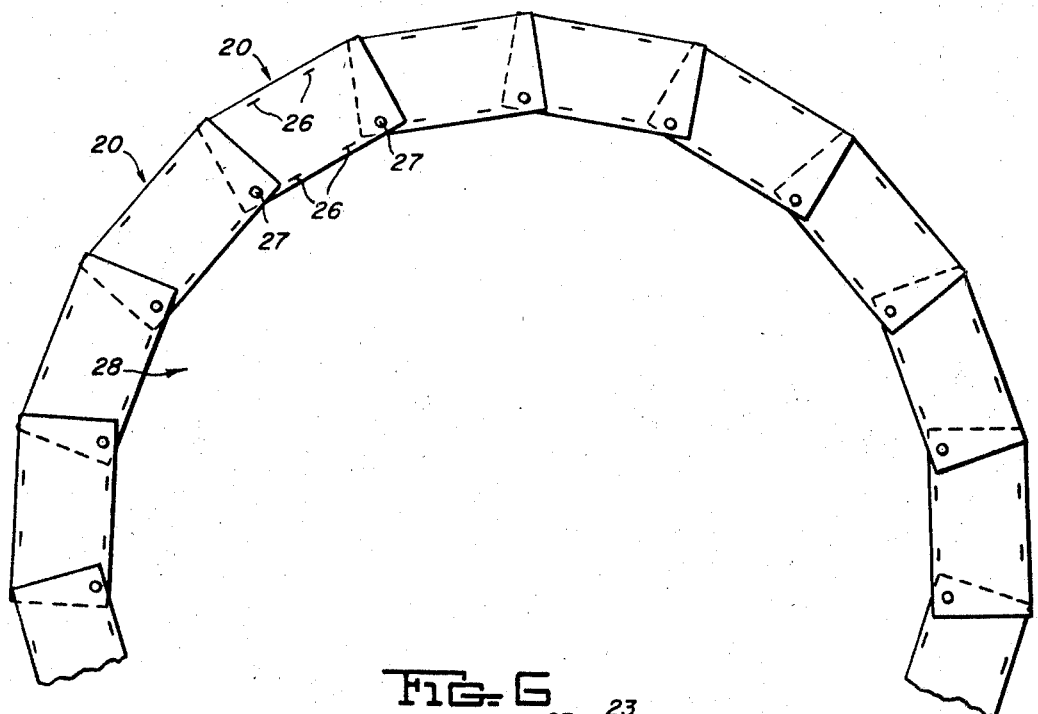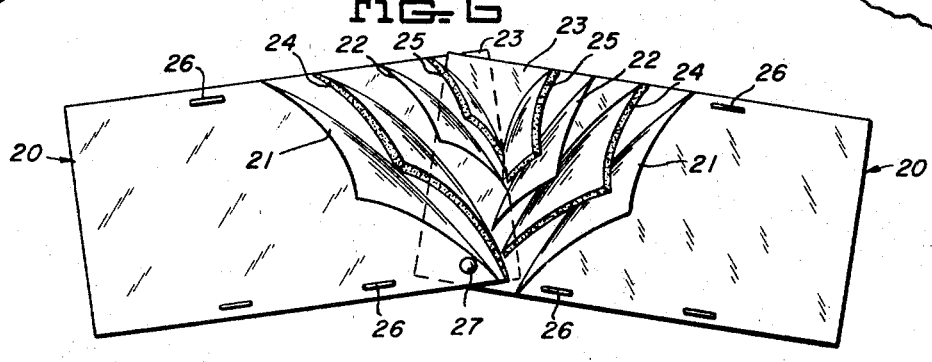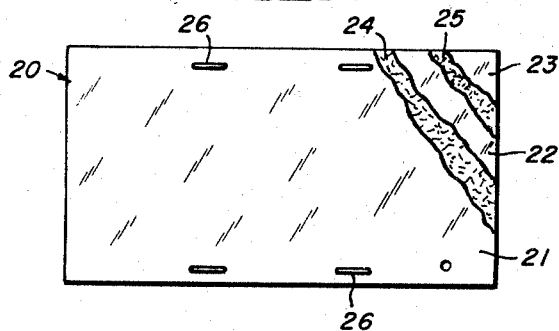

United States Patent Office

3,425,677
Patented Feb. 4, 1969

3,425,677
THERMAL BARRIER
Herbert A. White, Jr., Churchill, Pa.
(2516 Collins Road, Pittsburgh, Pa. 15235)
Filed Sept. 23, 1965, Ser. No. 489,700
U.S. Cl. 266—34                                13 Claims
Int. Cl. C21b 7/16; C21c 5/48; F16j 15/08

ABSTRACT OF THE DISCLOSURE

Apparatus for conveying hot fluids including two aligned tubular members having matching end surfaces, and a deformable thermal barrier between the end surfaces, the thermal barrier having two outer layers of steel foil and an intermediate layer of steel foil with a layer of high temperature resistant insulating material between the intermediate layer and each outer layer.

---

This invention relates to a thermal barrier and particularly to a thermal barrier between two aligned tubular members. In conveying fluids through aligned tubular members in which the temperature of the fluid differs greatly from the surrounding atmosphere, especially where the insulation of one of the members differs greatly from that of the other, the heat loss through the connection is much greater than expected even though gaskets are used. This is particularly true in those cases where axial pressure is applied to the aligned tubular members. For example, my invention is particularly suited with blowpipes of the type disclosed in my Patent No. 3,031,178 dated Sept. 9, 1960. Gaskets used in the joint become damaged either due to the heat or during the insertion of the gasket into the assembly.

Hence, it is an object of my invention to provide a thermal barrier for use between two aligned tubular members where the heat loss is kept to a minimum.

Another object is to provide such a tubular barrier which can withstand rough usage.

Other objects will be apparent after referring to the following specification and attached drawings, in which:

FIGURE 1 is a view showing my thermal barrier installed in a blowpipe assembly;

FIGURE 2 is a view taken along the line II—II of FIGURE 1;

FIGURE 3 is an enlarged view of one species of my invention;

FIGURE 4 is a sectional view taken along the line IV—IV of FIGURE 3;

FIGURE 5 is a view of a second species of my invention;

FIGURE 6 is an enlarged segmental view of a portion of FIGURE 5; and

FIGURE 7 is a view of a detail of FIGURE 6.

Referring now in more detail to the drawings, reference numeral 1 indicates the wall of a blast furnace having an opening therein for a tuyere cooler 2. A tuyere 3 is received in the tuyere cooler 2 in the usual manner. An insulated blowpipe 4 extends between the tuyere 3 and a penstock flange 5. It will be understood that the penstock flange may be replaced by other supporting means and the term will be used hereafter in this broad sense. The blowpipe 4 has an axial opening 6 therein and a concave female surface 7 facing a convex male surface 8 on the penstock flange 5.

According to my invention I provide a thermal barrier 9 between the surfaces 7 and 8. In the embodiment shown in FIGURES 3 and 4, I provide three layers of steel foil 10, 11 and 12 with layers 13 and 14 of high temperature resistant insulating material between the layers of steel foil. Staples 15 fasten the layers together. An axial opening 16 is provided through the barrier. I have found that a combination of alumina and silica is very suitable for the layers 13 and 14. One commercial product of this nature is sold as Fibre Frax paper.

I have found that when the thermal barrier 9 is inserted between the surfaces 7 and 8 and the blowpipe 4 and penstock 5 drawn into tight engagement the barrier 9 which is originally flat will conform to the shape of the surfaces 7 and 8 and thus prevent loss of heat. At the same time the outer layers of steel foil 10 and 12 will protect against tearing of the refractory paper or layers 13 and 14. The middle layer 11 serves to prevent tearing of the sheets 13 and 14 if the outer layers 10 or 12 rupture. By making the barriers larger than the diameter of the mating surfaces, they can be readily positioned manually by holding the barrier by its corners. The steel layers have temper and will deform under pressure of the spring bridle used in the blowpipe assembly. Then when heat from the hot blast is applied, the steel foil loses its temper and the barrier remains permanently in the formed shape.

It is sometimes desired to insert a thermal barrier 17 between the tuyere 3 and blowpipe 4. This creates a problem in positioning the barrier 17 since the joint is not accessible. I solve this problem as follows: The barrier 17, except for size, is made generally in the same manner as barrier 9. In addition, the outer layers of steel foil diametrically span the opening in the barrier in the form of a center strip 17S. Prior to positioning the blowpipe a wire 18 is positioned over the nose of the tuyere 2. This is done by passing the wire 18 with one end of a spring 19 secured thereto through the opening in the tuyere while holding it with any suitable tool. The barrier 17 is then positioned on the tuyere 3 and the other end of the spring 19 attached to the center strip 17S. The tension in the spring 19 will hold the barrier 17 in place while the blowpipe 4 is being positioned against it. When the blast is turned on it will not be long until the strip 17S, wire 18 and spring 19 are burnt out.

The embodiment of my invention shown in FIGURES 5, 6 and 7 is particularly suited and adapted for use with large diameter tubular members such as hot blast valves and burner shut off valves. A barrier for large diameter tubular members made according to FIGURE 3 is difficult to manufacture, ship and/or store. The species of FIGURES 5 to 7 does not have these drawbacks. This species includes a plurality of units 20 each made up of three layers or sheets of steel foil 21, 22 and 23 with intermediate layers 24 and 25 of the insulating material. The five layers are fastened together by means of staples 26 positioned only at the central portion of the units shown. Hence, the layers of each unit are not secured together at their ends. This permits the ends of the units to overlap with the layers of one unit bearing against the corresponding layers of the other unit as best shown in FIGURE 6. A pin 27 pivotally connects adjacent units and also holds the sheets together. By varying the number of connected units 20 the barrier can be used with tubular members of various diameters. This will be apparent from a study of FIGURE 5. When the barrier is assembled for use between two tubular members a central hole 28 corresponding to hole 16 of the first species is provided. In spite of the difference in thickness of the assembled units 20 due to the overlap, I have found that there will be no substantial leakage of air or passage of heat through the barrier when the blowpipe 4 and penstock 5 are drawn into tight engagement in the usual manner. This is also true when the flanges of valves and adjacent tubular members are drawn up tight.

It will be understood that other modifications may be made within the scope of the following claims.

I claim:

1. Apparatus for conveying hot air to a blast furnace comprising a penstock flange, a blowpipe aligned with said penstock flange, a tuyere aligned with said blowpipe, said penstock flange and blowpipe having matching end surfaces facing one another, said blowpipe and tuyere having matching end surfaces facing one another, and a readily deformable thermal barrier between at least one set of matching end surfaces, said thermal barrier including an outer layer of steel foil adapted to contact and conform to one end surface of a set, an outer layer of steel foil adapted to contact and conform to the other end surface of the set, a layer of high temperature resistant insulating material between the layers of steel foil, and means for holding the layers in assembled relationship.

2. Apparatus according to claim 1 in which the high temperature resistant insulating is a combination of alumina and silica.

3. Apparatus according to claim 1 including an intermediate layer of steel foil between the outer layers of steel foil and a separate layer of high temperature resistant insulating material between the intermediate layer of steel foil and each outer layer.

4. Apparatus according to claim 3 in which each of the layers of steel foil is a single sheet with a central hole therein, and each layer of high temperature resistant insulating material is a sheet having a central hole matching the holes in the sheets of steel foil.

5. In apparatus for conveying hot fluids including two aligned tubular members one having an end surface facing a matching end surface on the other tubular member; the improvement comprising a readily deformable thermal barrier between said end surfaces, said thermal barrier having an opening therethrough and including an outer layer of steel foil adapted to contact and conform to one end surface, an outer layer of steel foil adapted to contact and conform to the other of said end surfaces, a layer of high temperature resistant insulating material between the layers of steel foil, said high temperature resistant insulating material being a combination of alumina and silica, and means for holding the layers in assembled relationship.

6. In apparatus for conveying hot fluids including two aligned tubular members one having an end surface facing a matching end surface on the other tubular member; the improvement comprising a readily deformable thermal barrier between said end surfaces, said thermal barrier having an opening therethrough and including an outer layer of steel foil adapted to contact and conform to one end surface, an outer layer of steel foil adapted to contact and conform to the other of said end surfaces, an intermediate layer of steel foil between the outer layers of steel foil, a separate layer of high temperature resistant insulating material between the intermediate layer of steel foil and each outer layer, and means for holding the layers in assembled relationship.

7. Apparatus according to claim 6 in which the high temperature resistant insulating material is a combination of alumina and silica.

8. In apparatus for conveying hot fluids including two aligned tubular members one having an end surafce facing a matching end surface on the other tubular member; the improvement comprising a readily deformable thermal barrier between said end surfaces, said thermal barrier having an opening therethrough and including an outer layer of steel foil adapted to contact and conform to one end surface, an outer layer of steel foil adapted to contact and conform to the other of said end surfaces, a layer of high temperature resistant insulating material between the layers of steel foil, and means for holding the layers in assembled relationship.

9. In apparatus for conveying hot fluids including two aligned tubular members one having an end surface facing a matching end surface on the other tubular member, one of the aligned members being a blowpipe leading to a blast furnace tuyere and the other aligned member being a penstock flange; the improvement comprising a readily deformable thermal barrier between said end surfaces, said thermal barrier having an opening therethrough and including an outer layer of steel foil adapted to contact and conform to one end surface, an outer layer of steel foil adapted to contact and conform to the other of said end surfaces, a layer of high temperature resistant insulating material between the layers of steel foil, and means for holding the layers in assembled relationship.

10. Apparatus according to claim 9 in which each of the layers of steel foil is a single sheet with a central hole therein and the layer of high temperature resistant insulating material is a sheet of an alumina-silica mixture having a central hole aligned with the holes in the sheets of steel foil.

11. In apparatus for conveying hot fluids including two aligned tubular members one having an end surface facing a matching end surface on the other tubular member, one of the aligned members being a blowpipe and the other aligned member being a tuyere; the improvement comprising a readily deformable thermal barrier between said end surfaces, said thermal barrier having an opening therethrough and including an outer layer of steel foil adapted to contact and conform to one end surface, an outer layer of steel foil adapted to contact and conform to the other of said end surfaces, each layer of steel foil being a single sheet with a central hole therein, a layer of high temperature resistant insulating material between the layers of steel foil, said layer of insulating material being a sheet having a central hole therein aligned with the holes in the sheets of steel foil, at least one of the layers of steel foil spanning the central part of the hole therein to provide an attachment strip, and means for holding the layers in assembled relationship.

12. In apparatus for conveying hot fluids including two aligned tubular members one having an end surface facing a matching end surface on the other tubular member; the improvement comprising a readily deformable thermal barrier between said end surfaces, said thermal barrier having an opening therethrough and including an outer layer of steel foil adapted to contact and conform to one end surface, an outer layer of steel foil adapted to contact and conform to the other of said end surfaces, a layer of high temperature resistant insulating material between the layers of steel foil, each of the layers of steel foil being a plurality of sheets arranged in overlapping pivoted relationship, and the layer of high temperature resistant insulating material being a plurality of sheets of essentially the same size and shape as the sheets of steel foil, said steel sheets and insulating sheets being arranged in units with each unit being pivoted to the adjacent units on the side adjacent the axis of the barrier, and means for holding the layers in assembled relationship.

13. Apparatus according to claim 12 in which the adjacent units nest one into the other end and the inner portion of the layers are spaced from the axis of the barrier to provide a central hole.

References Cited

UNITED STATES PATENTS

| | | | |
|---|---|---|---|
| 529,831 | 11/1894 | Peckham et al. | 277—234 X |
| 1,798,246 | 3/1931 | Braner | 161 |
| 3,031,178 | 4/1962 | White | 266—41 |
| 3,185,489 | 5/1965 | Klinger et al. | 277—234 X |
| 3,233,699 | 2/1966 | Plummer | 161—196 X |
| 3,281,135 | 10/1966 | Boron | 266—41 X |

FOREIGN PATENTS

| | | |
|---|---|---|
| 1,106,864 | 7/1955 | France. |

WILLIAM J. STEPHENSON, *Primary Examiner.*

EUGENE MAR, *Assistant Examiner.*

U.S. Cl. X.R.

266—41; 161—112, 109, 196; 277—234